United States Patent
Bhan et al.

(10) Patent No.: US 8,060,089 B1
(45) Date of Patent: *Nov. 15, 2011

(54) PAGING SUCCESS RATE CONTROL MECHANISM

(75) Inventors: Ashish Bhan, Shawnee, KS (US); Jasinder Pal Singh, Olathe, KS (US); Maulik Shah, Overland Park, KS (US); Anil Harishankar Singh, Leawood, KS (US); Jason Peter Sigg, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/235,305

(22) Filed: Sep. 22, 2008

(51) Int. Cl.
*H04W 4/00* (2009.01)

(52) U.S. Cl. ............ 455/435.1; 455/434; 455/453; 455/515; 370/346; 370/458; 340/7.22

(58) Field of Classification Search .......... 455/67.11, 455/127.5, 343.2, 343.5, 423, 424, 426.1, 455/434, 435.1, 435.2, 435.3, 436, 440–442, 455/450, 452.1, 452.2, 453, 456.1, 458, 464, 455/509, 515, 522, 574; 340/7.1, 7.2, 7.21, 340/7.22, 7.23, 7.28, 7.32–7.38; 370/310–312, 370/318, 321, 322, 328–332, 336, 337, 341, 370/342, 346, 437, 442, 443, 449, 458, 459, 370/464, 468
See application file for complete search history.

(56) References Cited

U.S. PATENT DOCUMENTS

| | | | |
|---|---|---|---|
| 5,738,144 A | 4/1998 | Rogers | |
| 5,754,959 A | 5/1998 | Ueno et al. | |
| 5,794,140 A | 8/1998 | Sawyer | |
| 6,014,694 A | 1/2000 | Aharoni et al. | |
| 6,035,196 A * | 3/2000 | Hengeveld et al. | 455/437 |
| 6,078,568 A * | 6/2000 | Wright et al. | 370/312 |
| 6,078,957 A | 6/2000 | Adelman et al. | |
| 6,108,542 A | 8/2000 | Swanchara et al. | |
| 6,393,285 B1 | 5/2002 | Stephens | |
| 6,681,256 B1 | 1/2004 | Kuntze et al. | |
| 6,745,039 B1 * | 6/2004 | Di Lalla | 455/458 |
| 6,745,998 B2 | 6/2004 | Doyle | |
| 6,819,926 B2 | 11/2004 | Karlsson et al. | |
| 6,978,135 B2 * | 12/2005 | Sasada | 455/435.1 |
| 7,213,065 B2 | 5/2007 | Watt | |
| 7,917,143 B2 * | 3/2011 | Jiao et al. | 455/435.1 |
| 7,986,946 B2 * | 7/2011 | Pettersson | 455/424 |
| 2002/0090945 A1 | 7/2002 | Sasada | |
| 2002/0152432 A1 | 10/2002 | Fleming | |
| 2002/0152446 A1 | 10/2002 | Fleming | |
| 2003/0096612 A1 * | 5/2003 | Kim et al. | 455/435 |
| 2003/0136932 A1 | 7/2003 | Doyle | |
| 2004/0124389 A1 | 7/2004 | Phillips | |

(Continued)

OTHER PUBLICATIONS

M. Handley et al, RFC, 2543, SIP: Session Initiation Protocol, Mar. 1999, first page.

(Continued)

*Primary Examiner* — Anthony Addy

(57) ABSTRACT

A method for handling registration requests in a cellular wireless communication system. The method includes determining that a transmission-success rate of messages sent via the forward-link of an air interface is less than a threshold success rate. The method further includes, in response to the determination that the system has less than a threshold transmission success rate, increasing a frequency at which mobile stations register with the cellular wireless communication system via the air interface.

11 Claims, 6 Drawing Sheets

U.S. PATENT DOCUMENTS

| | | | |
|---|---|---|---|
| 2004/0230661 A1 | 11/2004 | Rashid | |
| 2004/0243702 A1 | 12/2004 | Vainio | |
| 2004/0252669 A1 | 12/2004 | Hosein | |
| 2005/0009534 A1 | 1/2005 | Harris | |
| 2006/0116124 A1* | 6/2006 | Signore et al. | 455/435.1 |
| 2009/0004974 A1* | 1/2009 | Pyhalammi et al. | 455/67.11 |
| 2010/0020781 A1* | 1/2010 | Tayloe et al. | 370/342 |
| 2011/0045824 A1* | 2/2011 | Bischoff et al. | 455/426.1 |

OTHER PUBLICATIONS

S. Donovan et al., Session Initiation Protocol Extension for Session Timer, Jul. 1, 2002, Internet Engineering Task Force.
U.S. Appl. No. 10/667,881, filed Sep. 22, 2003.
Office Action for U.S. Appl. No. 10/667,881, mailed Jun. 11, 2008.
Office Action for U.S. Appl. No. 10/667,881, mailed Jan. 10, 2008.
Office Action for U.S. Appl. No. 10/667,881, mailed Oct. 17, 2007.
Office Action for U.S. Appl. No. 10/667,881, mailed May 4, 2007.
U.S. Appl. No. 11/038,944, filed Jan. 18, 2005.
Office Action for U.S. Appl. No. 11/038,944, mailed Jul. 27, 2007.
Office Action for U.S. Appl. No. 11/038,944, mailed Jan. 14, 2008.
Office Action for U.S. Appl. No. 11/038,944, mailed Apr. 17, 2008.
Veerasamy et al, Practical approach to optimize paging success rate in CDMA Network. Wireless Communications and Networking Conference Mar. 13, 2005.
Lee, et al, On Optimum Timer Value of Area and Timer-Based Location Registration Scheme, IEEE Communications Letters, Apr. 2001.
Tassiulas et al, A hierarchical multiresolution registration structure for mobility tracking, 1996.
G. Y. Lee, Numerical analysis of optimum timer value for time-based location registration scheme, IEEE Communications Letters, Oct. 2002.
Zang et al, Mining call and mobility data to improve paging efficiency in cellular networks, MobiCom'07, Sep. 9, 2007.
Lei et al, Probability criterion based location tracking approach for mobility management of personal communications systems, Abstract, Nov. 3, 1997.
Office Action for U.S. Appl. No. 11/038,944, mailed Dec. 19, 2008.
Office Action for U.S. Appl. No. 11/038,944, mailed Jun. 18, 2009.
Office Action for U.S. Appl. No. 11/038,944, mailed Oct. 16, 2009 .
Office Action for U.S. Appl. No. 11/038,944, mailed Apr. 26, 2010.
Office Action for U.S. Appl. No. 11/038,944, mailed Jul. 23, 2010.
Office Action for U.S. Appl. No. 11/038,944, mailed Oct. 1, 2010.
Notice of Allowability for U.S. Appl. No. 11/038,944, mailed Mar. 9, 2011.
Notice of Allowability for U.S. Appl. No. 11/038,944, mailed Jun. 17, 2011.

* cited by examiner

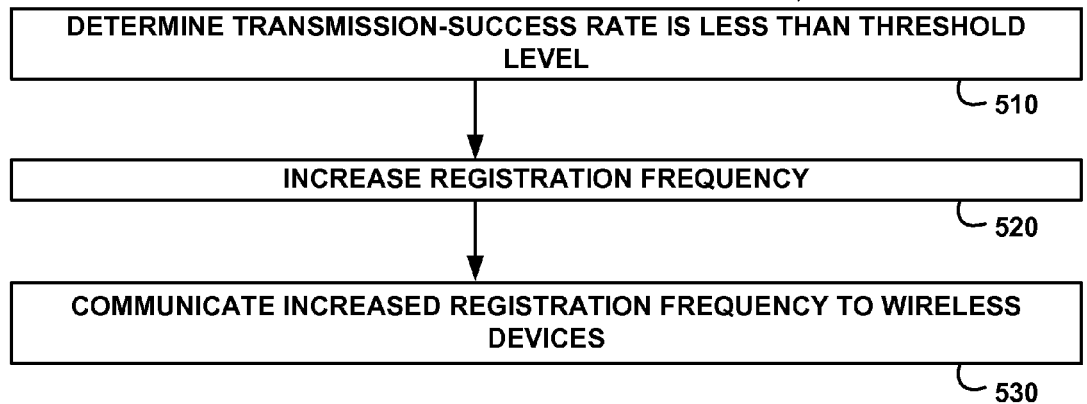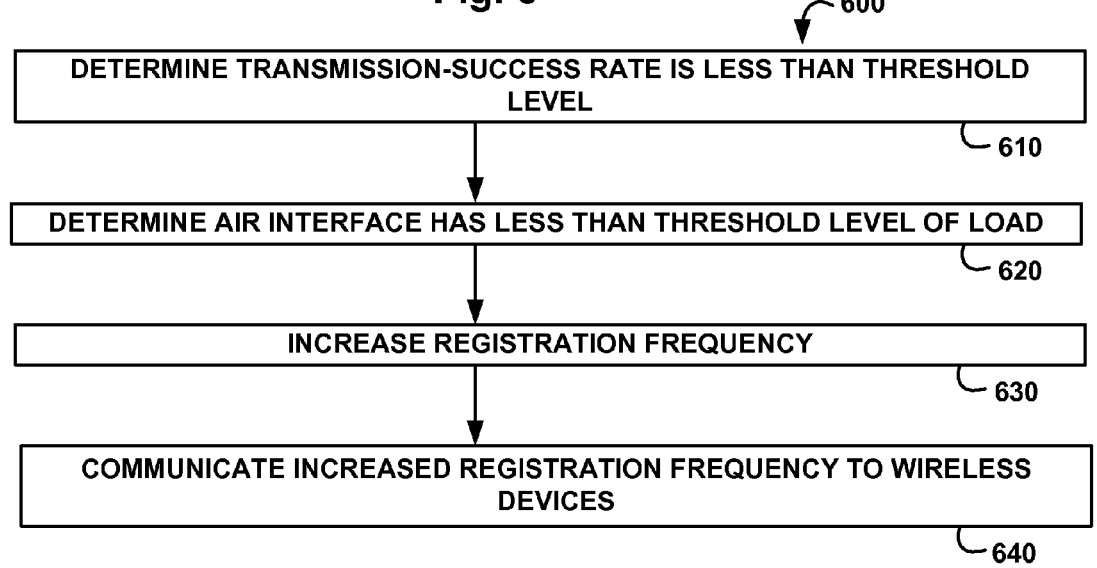

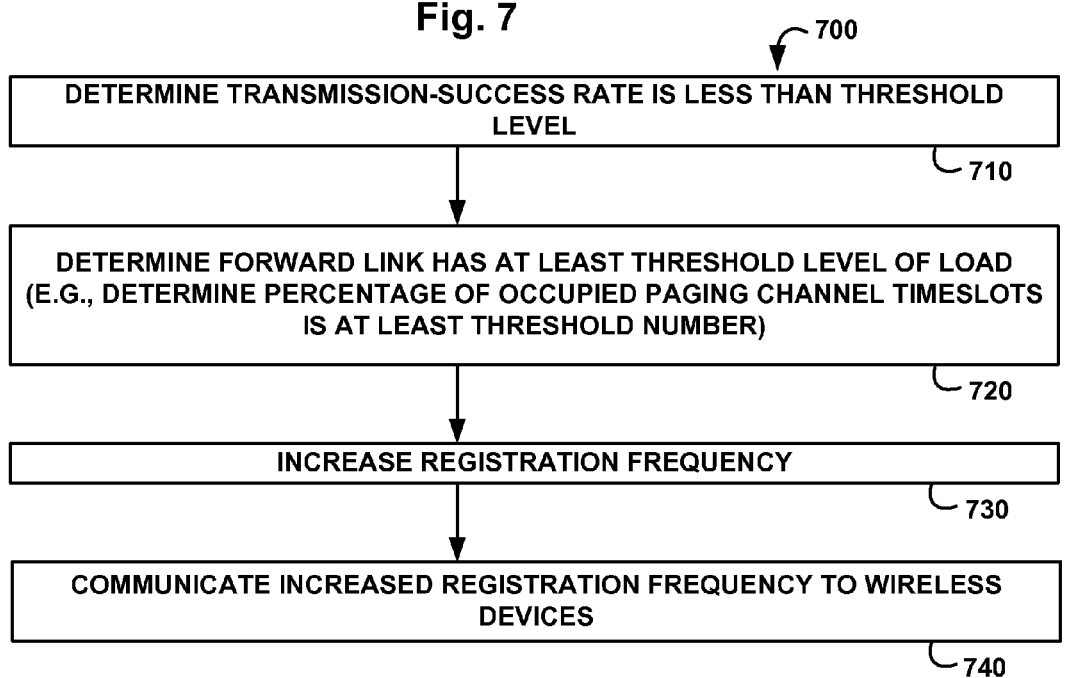
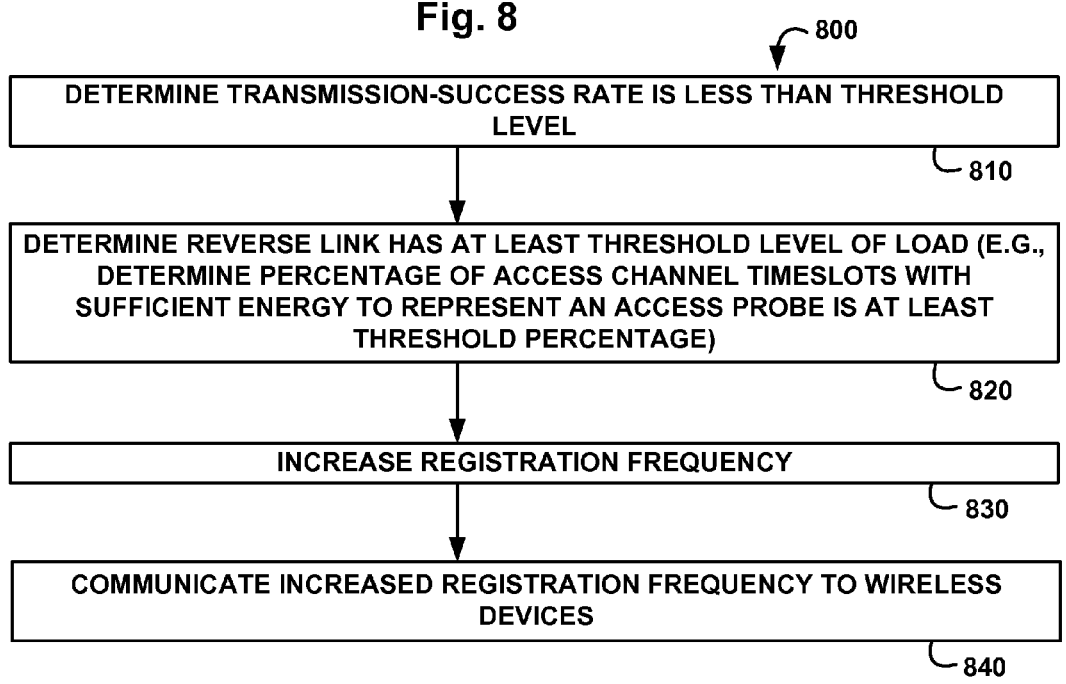

PAGING SUCCESS RATE CONTROL MECHANISM

BACKGROUND

In a cellular wireless communication system, an area is divided into cells, which are further divided into cell sectors ("sectors"). Each cell and cell sector is defined by a radiation pattern from a respective base transceiver station (BTS), which includes a radio-frequency antenna tower. Each BTS is then typically connected with a base station controller (BSC), which, together with the BTS, defines a "base station." Further, the BSC may then be connected with a switch (e.g., mobile switching center (MSC)) or gateway (e.g., packet data serving node (PDSN)) that provides connectivity with a transport network, such as the public switched telephone network (PSTN) or the Internet. With this arrangement, a cell phone or other wireless communication device (generally "mobile station") that is positioned within the coverage area of a given sector can communicate over an air interface with the BTS and in turn via the BSC and switch or gateway with entities on the transport network.

Unlike landline telephones that exist at known, fixed locations, mobile stations can operate at virtually any location where a wireless carrier provides radio-frequency coverage. Consequently, in order for a mobile station to be able to engage in useful communications (voice or data) in a cellular wireless communication system, the mobile station must first register with the system. This registration process lets the system know where the mobile station is located (e.g., for purposes of directing calls to the mobile station) and so that the system can verify that the mobile station is authorized to be operating in the system.

The manner in which a mobile station registers with a cellular wireless communication system can take various forms, depending on factors such as the configuration of the system and on the communication protocols used. For example, such registration may be accomplished using Code Division Multiple Access ("CDMA"). CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

In a system operating according to the CDMA2000 protocol, for instance, a mobile station registers by sending over the air to the base station an "access probe," which carries an identifier of the mobile station and perhaps other pertinent information. The mobile station sends the access probe in a "slotted aloha process." In the slotted aloha process, the mobile station repeatedly sends the access probe at increasingly higher power levels until it receives an acknowledgement message from the base station, or until it otherwise exhausts the process (e.g., the maximum transmission power of the mobile station is reached and no acknowledgment has been received). As is described in the CMDA2000 specifications, each access probe travels in a timeslot of an air interface access channel from the mobile station to the base station, while each registration acknowledgement travels in a timeslot of an air interface paging channel from the base station to the mobile station.

When the base station receives an access probe from a mobile station, the base station passes the access probe along to the switch (e.g., an MSC) or other entity (e.g., a PDSN), which then responsively sends a registration notification message to the mobile station's home location register (HLR). The HLR then updates the mobile station's profile to indicate where the mobile station is operating (e.g., which switch is serving the mobile station) and may further carry out an authentication process, and then sends a registration response, which propagates to the mobile station. If the mobile station has registered with a base station that is not in its "home network" (e.g., operated by the wireless provider with which the mobile station is associated), the registration information for the mobile station is stored in a visitor location register (VLR) in the network in which the mobile station is operating (which may be termed "roaming"), as well as in an HLR in the mobile station's home network.

Various trigger events can cause mobile stations to register with the system. In a CDMA2000 system, for instance, a mobile station will generally register (i) whenever it enters a new zone (e.g., sector and/or cell) in response to a distinct "reg_zone" parameter the mobile station receives in an air interface control channel message from the base station, (ii) on a periodic basis, with a period indicated by a "reg_period" parameter (or directive) that the mobile station receives in an air interface control channel message from the base station, and (iii) when the mobile station receives or places a call.

In some situations, messages transmitted from the system to a mobile station may not successfully reach the mobile station. For example, a mobile station may have moved out of a particular zone (e.g. sector and/or cell), or the mobile station may be in a location where signals from the system are attenuated or subject to interference. A decrease in the successful transmission of messages from the system to a mobile station can negatively impact a customer's experience by causing calls to be directed to voicemail without notifying the user, delaying the receipt of SMS notifications, causing call set up latencies, and generally causing suboptimal performance of features that rely on messages being transmitted from the system to the mobile station.

In some situations, the air interface between a base station (e.g., a particular sector associated with the base station) and mobile stations operating within the coverage area of the base station can become overwhelmed with too much use. This can happen, for example, if too many mobile station registrations occur at once. In a CDMA2000 system, for instance, if access probes from two or more mobile stations line up (by chance) in the same timeslot of the access channel, an "access probe collision" occurs. The result of such a collision is that none of the probes will succeed, principally because the base station will not receive any of the probes in a comprehensible form due to interference between the multiple access probes. Thus, should such a collision occur, each mobile station would have to re-send its access probe, because it would not receive an acknowledgement from the base station.

In many situations, access probe collisions are not very likely to occur because sufficient timeslots exist on the access channel for transmitting the access probes. However, in situations where many users are placing calls at once, the number of access probes and access probe collisions can increase dramatically due to collisions and associated retries. For example, after a football game or in an emergency situation, many people within a given sector of a specific cell site may use their mobile phones to place calls (e.g., to call 911, to call friends and family, to check voice mail, or for other purposes).

Each time a mobile station places a call, as was noted above, the mobile station sends an access probe. Consequently, in a situation where many people within a given sector place calls at once, many access probes will be sent at once. In turn, access probe collisions then occur and, therefore, still more (retry) access probes are sent. Further, as these collisions and retries are occurring, other mobile stations in the sector are periodically registering with the system, according to the "reg_period" directive from the base station, which will still further increase the frequency of access probe collisions. In a CDMA2000 system, the reg_period directive includes the frequency with which mobile stations periodically register with the system. Such access probe collisions may result in mobile stations being unable to place calls, receive calls, send data and/or receive data, as the mobile stations may be unable to successfully register with the system due to the occurrence of access probe collisions.

Overview

Systems and methods for dynamic adjustment of radio frequency registration periods based on transmission-success rates and load conditions are disclosed. These systems and methods help ensure that a wireless communication system pages a target mobile station at the proper location. When a mobile station moves between coverage areas, experiences interference, or receives an attenuated or degraded signal from the system, messages transmitted from the system may not successfully reach a particular mobile station. This situation, as was discussed above, is undesirable as it may result in a mobile station being unable to receive a voice call, the delayed receipt or notification of messages, and the suboptimal performance of other features that rely on messages transmitted from the system to the mobile station.

A method that helps to increase the likelihood that a mobile station is paged in the proper location includes (i) determining a transmission-success rate of messages sent via a forward link of an air interface in a cellular wireless communication system is less than a threshold success rate, and (ii) responsively increasing a frequency at which mobile stations register with the cellular wireless communication system via the air interface. It will be appreciated that these functions can be carried out by a base station, such as by a BTS and/or a BSC. However, these function can be carried out by other network elements as well, such as by an MSC, a PDSN, or any number of other communication system platforms.

The process of determining that a transmission-success rate of message sent via a forward link of an air interface in a cellular wireless communication can be accomplished in a number of ways. In a first embodiment, the process includes sending one or more page messages from the system to one or more mobile stations via the forward link of the air interface. Upon receipt of a page message, the mobile station may send a message acknowledging receipt of the page message back to the system via the reverse link of the air interface, thus indicating a successful transmission. The system may determine a transmission-success rate by tracking the number of page messages sent and the number of acknowledgments received. After computing a transmission success rate, the system may compare the transmission-success rate to a predetermined threshold.

In a second embodiment, the method conditions increasing the frequency at which mobile stations register with the system on a determination that the air interface in the cellular wireless communication system has less than a threshold level of load. In some situations, such as when there are many mobile stations concentrated in a small area, increasing the registration frequency of mobile stations can cause a significant increase in the load on the air interface. In a CDMA2000 system, conducting high frequency periodic registrations for mobile stations within the coverage area of the particular sector will add to the number of access probes communicated to the base station and can, as a result, increase the occurrence of access probe collisions. This situation, as was discussed above, is undesirable as it may result in the mobile stations within the coverage area of the particular sector being unable to place or receive calls and/or unable to send or receive data. The likelihood of overloading the air interface in this manner can be reduced by conditioning the increase in registration frequency on a load level of the interface.

The process of determining that the air interface has at least a threshold level of load can be accomplished in a number of ways. In one embodiment, the process includes detecting at least a threshold level of reverse-link air interface load (where "reverse-link" means the air interface link from mobile stations to the base station, as compared with "forward-link," which means the link from the base station to the mobile stations).

More particularly, in a CDMA2000 system, the process of this first embodiment includes determining that at least a threshold percentage of access channel timeslots are occupied over a given period of time. This determination can be made by the base station. For example, the base station may include service logic that, when executed, determines what percentage of the access channel timeslots contain energy that is sufficient to be an access probe within a designated time period (e.g., every 1 minute, every 5 seconds, etc.). The number of occupied time slots should include timeslots that contain sufficient energy to represent an access probe but do not actually contain a verifiable access probe (e.g., where a cyclic redundancy check establishes that the timeslot does not contain a legitimate access probe), as such timeslots may exist as the result of access probe collisions. If the determined percentage exceeds a designated threshold, then the base station concludes that the air interface has at least a threshold level of load. In this situation, the base station responsively increases the periodic registration period (e.g., via the reg_period directive) to reduce that loading and communicates the increased period to the mobile stations operating in the coverage area of the respective sector.

In another embodiment, the base station tests for the presence of at least a threshold level of forward-link load to determine air interface loading. This embodiment may be implemented in conjunction with or as an alternative to testing for a threshold reverse-link load. For example, in a CDMA2000 system, the base station can determine if at least a threshold percentage of paging channel timeslots are occupied over a given period of time. As noted above, access probe acknowledgements travel in a paging channel of the forward-link, so when the paging channel is more occupied, there is more likelihood that access probe acknowledgements might be delayed or not sent, thereby triggering further access probes and exacerbating the access probe collisions problem further.

These and other aspects will become apparent to those of ordinary skill in the art by reading the following detailed description, with reference, where appropriate, to the accompanying drawings. Further, it should be understood that the embodiments noted in this overview are only examples and not intended to limit the scope of the invention as claimed.

BRIEF DESCRIPTION OF THE DRAWINGS

Exemplary embodiments of the present invention are described herein with reference to the drawings, in which:

FIG. 5 is a flowchart illustrating a method for dynamically adjusting mobile station registration periods based on a message transmission-success rate;

FIG. 6 is a flowchart illustrating a method for dynamically adjusting mobile station registration periods based on a transmission-success rate and conditioned on an air interface load condition;

FIG. 7 is a flowchart illustrating a method for dynamically adjusting mobile station registration periods based on a message transmission-success rate and conditioned on forward-link air interface load conditions; and FIG. 8 is a flowchart illustrating a method for dynamically adjusting mobile station registration periods based on a message transmission-success rate and conditioned on reverse-link air interface load conditions

DETAILED DESCRIPTION

While embodiments of systems and methods for dynamic adjustment of registration periods based on load conditions are discussed generally in the context of CDMA wireless communication systems, it will be appreciated that the invention is not limited in this respect and that embodiments of the invention may be implemented in any number of types of wireless communication systems, such as time division multiple access (TDMA) systems, EV-DO systems, and global system for mobile communications (GSM) systems, for example. As in most telecommunication and data applications, it will also be appreciated that many of the elements of the various embodiments described herein are functional entities that may be implemented as hardware, firmware and/or software. Additionally, many of these elements may be implemented as discrete components or in conjunction with other components, in any suitable combination and location.

Organization of the Disclosure

This disclosure is organized as follows. A wireless communications system (including an air interface) in which the disclosed methods and systems may be implemented is discussed generally with reference to FIG. 1. The air interface between the mobile stations and the base station of FIG. 1 as it relates to mobile station registration is described in further detail with reference to FIG. 2. Communication of access probes and access probe collisions in a reverse-link access channel are described with reference to FIG. 3. An arrangement of neighboring sectors in which the disclosed methods and systems may be implemented is described with respect to FIG. 4. And methods for dynamically adjusting the registration period for mobile stations in the system 100 of FIG. 1 are described with reference to FIGS. 5-8.

Wireless Communications System

Figure 1:
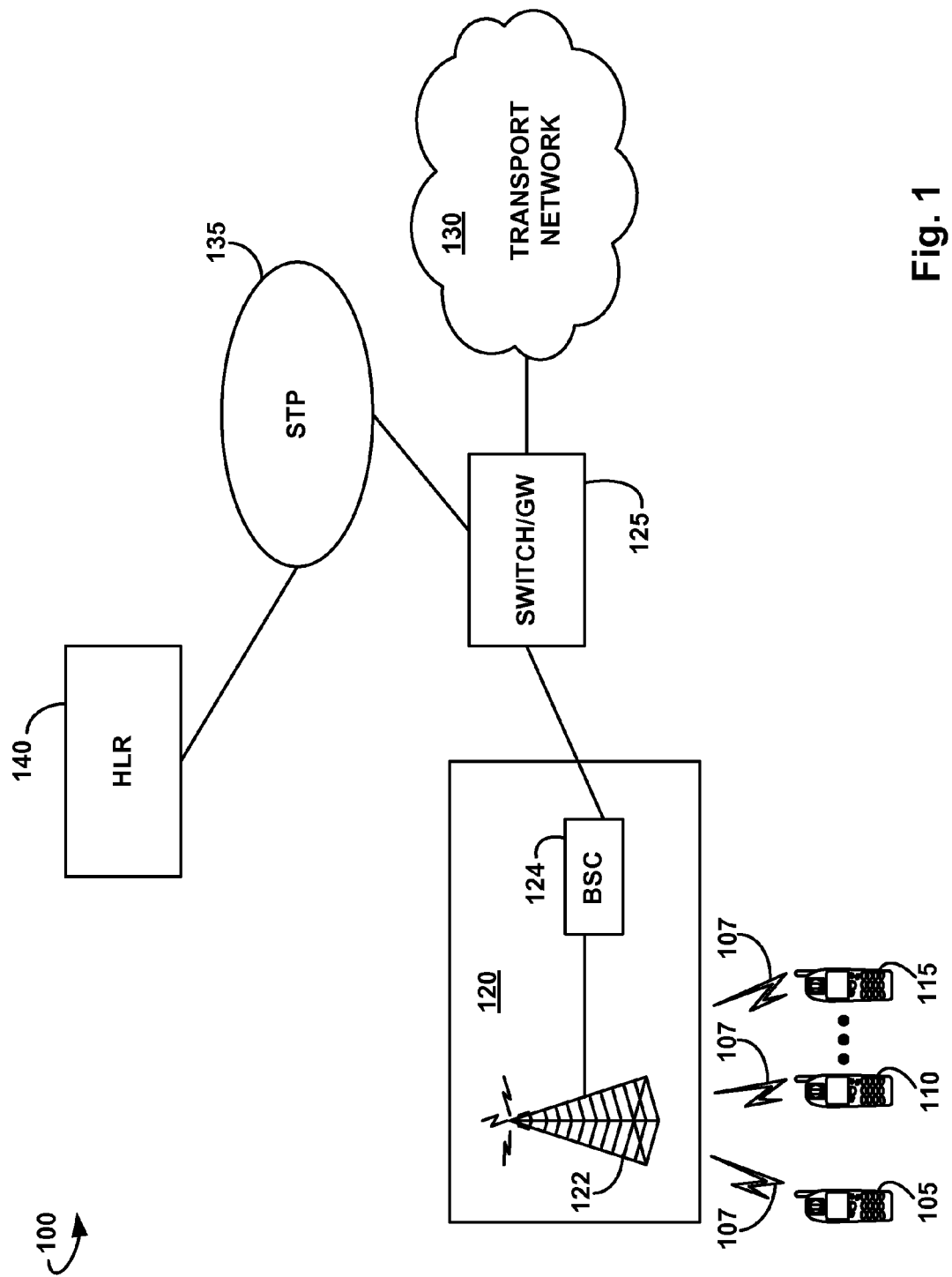
FIG. 1 is a diagram illustrating a wireless communications system in which the embodiments disclosed here may be implemented.

FIG. 1 is a diagram that illustrates a wireless communication system 100 in which the embodiments described in this disclosure may be implemented. System 100 includes a plurality of mobile stations 105, 110 and 115, which may be cellular phones, wireless personal digital assistants, a wireless enabled computer or any other device capable of wireless communication in system 100. System 100 generally illustrates a configuration of a CDMA2000 compliant system. As is indicated by the dotted line in FIG. 1, system 100 may include any number of mobile stations.

The mobile stations 105, 110 and 115 communicate, via a radio air interface 107, with a base station 120. The base station 120 includes a base-station transceiver (BTS) 122 and a base-station controller (BSC) 124. The BTS 122 communicates with the mobile stations 105, 110 and 115 using radio-frequency signals over the air interface 107. The BTS 122 also communicates with the BSC 124 to communicate voice and/or data information to and from the mobile stations 105, 110 and 115.

The base station 120 is, in turn, coupled with a switch/gateway 125. The switch/gateway 125 may take the form of any number of devices. For example, for voice communication, the switch/gateway 125 may comprise a mobile switching center (MSC). Alternatively, for data communication the switch/gateway 125 may comprise a packet data serving node (PDSN). MSCs and PDSNs are both described in further detail in the CDMA2000 specifications and are not discussed in detail here for the purpose of brevity. Also, it will be appreciated that additional switch/gateway devices or systems may be coupled with the base station 120.

The switch/gateway device 125 is also coupled with a transport network 130. As was described above, for voice communications, the transport network 130 may take the form of the public switched telephone network. Alternatively, for data communication, the transport network 130 may take the form of the public Internet or any suitable data network, such as a private packet data network.

The switch/gateway 125 is further coupled with a signal transfer point (STP) 135. The STP 135 provides for the transfer of signals between different entities in the system 100. For the particular embodiment shown in FIG. 1, the STP 135 provides for transferring signals between the switch/gateway 125 and a home location register (HLR) 140. In accordance with the CDMA2000 specification, the HLR includes registration information for the mobile stations 105, 110 and 115. This registration information includes, for example, a unique mobile identification number for each of the mobile stations.

For any mobile station that may be operating outside its home network (e.g., "roaming"), system 100 may include the registration information for that mobile station in a visitor location record (VLR), which may be implemented in conjunction with the HLR 140 or may be implemented separately. In this situation, the registration information for the roaming mobile station is also included in an HLR of the roaming mobile station's home network so that calls to the mobile station are properly routed. Additionally, the system 100 may include other entities that are coupled with the STP 135, such as additional switch/gateways devices, service nodes, or any number of other platforms or devices for providing communication services in system 100.

Air Interface and Mobile Registration

Figure 2:
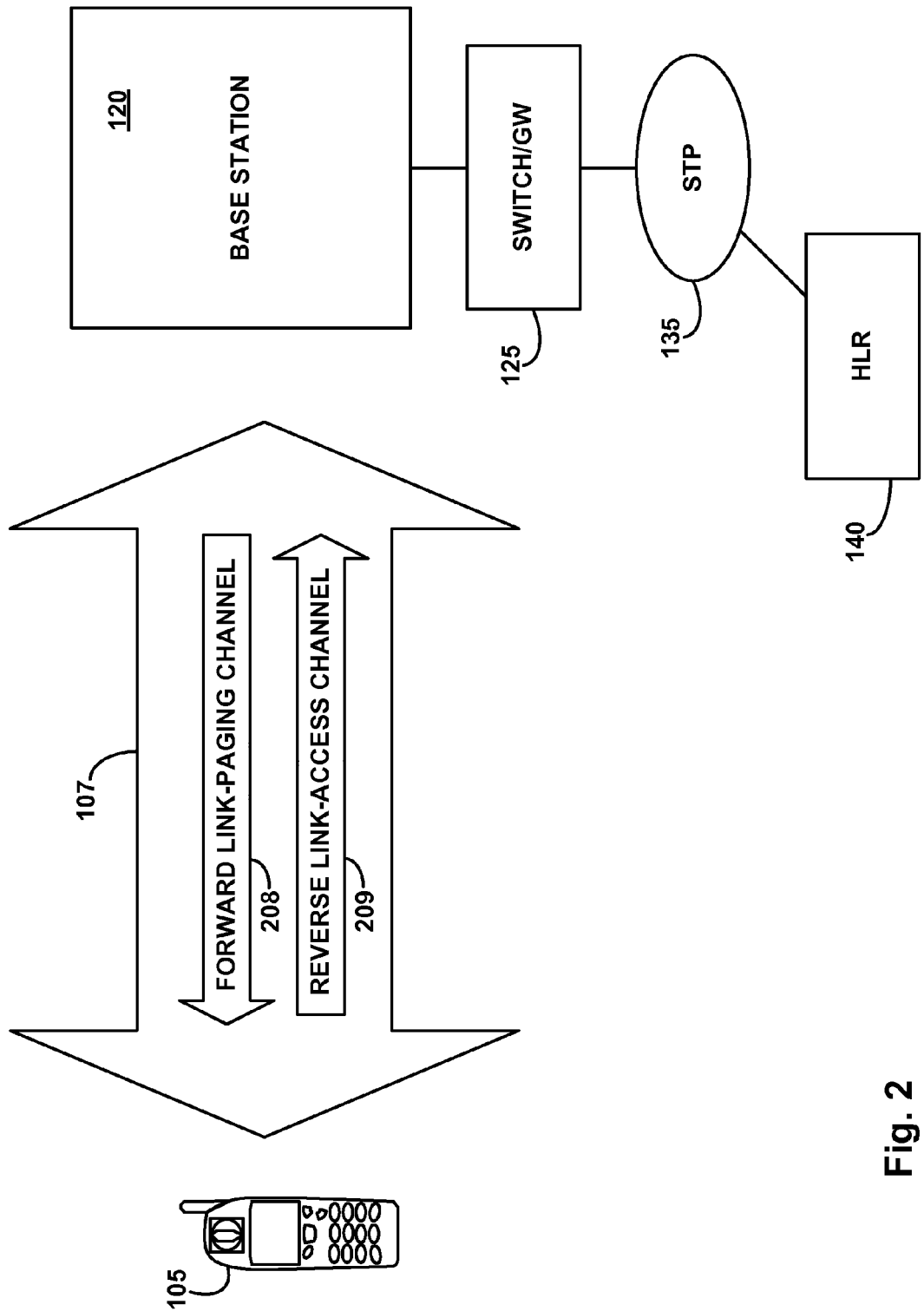
FIG. 2 is a diagram illustrating the air interface of the wireless communications system of FIG. 1 in more detail.

FIG. 2 is a diagram that illustrates a portion of system 100, with the air interface illustrated in more detail. The elements of the system 100 that are shown in FIG. 2 are those elements that are involved in the registration of the mobile station 105 for this particular embodiment. As was discussed above, there are various trigger events that can cause mobile stations to register in a CDMA2000 system. These events include (i) the mobile station 105 receiving a "reg_zone" directive from the base station 120 via a control channel message in the air interface 107. (ii) the mobile station 105 registering on a periodic basis, with a period indicated by a "reg_period" directive that the mobile station 105 receives in a control channel message from the base station 120, and (iii) when the mobile station 105 receives or places a call. The control channel is not specifically shown in FIG. 2.

The mobile station 105 registers with system 100 by sending an access probe via the reverse-link access channel 209 of the air interface 107. The access probe includes information that identifies the mobile station 105. This information may include an indication of the service provider with which the mobile station 105 is associated and a unique mobile identification number of the mobile station 105. The base station 120 receives the access probe and communicates the access probe to the switch/gateway, which then responsively sends a registration notification message to the HLR 140 via the STP 135.

The HLR 140 then updates the mobile station's 105 profile to indicate where the mobile station 105 is operating (e.g., which switch/gateway and base station are serving the mobile station 105). Additionally, the HLR 140 may also carry out an authentication process to ensure the mobile station 105 is authorized to operate in the wireless communications system 100. The HLR 140 then sends a registration response, which propagates to the mobile station 105 via the STP 135, the switch/gateway 125 and the base station 120. The base station 120 communicates the registration response message to the mobile device 105 via a forward-link—paging channel 208 of the air interface 107. Regardless of the trigger that results in registration occurring, this registration process will be essentially the same for a mobile station registering in its home network.

However, as noted above, this process may be somewhat different if the mobile station 105 has registered through a base station that is not in its "home network." In this instance, the registration information for the mobile station 105 is stored in a visitor location register (VLR) in the network in which the mobile station 105 is operating (a "foreign network"), as well as in an HLR in the mobile station's 105 home network. In this situation, the mobile station 105 may be referred to as "roaming" (e.g., operating in a radio frequency coverage area outside its home network).

Access Channel Timeslots and Access Probe Collisions

Figure 3:
FIG. 3 is a diagram illustrating access probe collisions in the access channel of the reverse-link of the air interface shown in FIG. 2.

Referring to FIG. 3, a table is shown that illustrates how access probes are communicated from a mobile station to a base station. The table in FIG. 3 shows seven consecutive timeslots in the reverse-link—access channel 208 of the air interface 107 of FIGS. 1 and 2. The table in FIG. 3 represents the timeslots of the access channel 208 for a particular sector in a wireless communications system. These timeslots are designated Time Slot-1 through Time Slot-7. In each timeslot, access probes that are communicated by the mobile stations operating in this particular sector are shown in respective columns. As shown in FIG. 3, ten access probes are represented, which are designated AP1 through AP10.

For the particular situation illustrated in FIG. 3, access probe collisions would occur in timeslots Time Slot-1, Time Slot-3 and Time Slot-5. In comparison, no collisions would occur and valid access probes would be received (and the associated mobile devices registered) for the timeslots Time Slot-2, Time Slot-4 and Time Slot-7. As is also shown in FIG. 3, there are no access probes present in Time Slot-6. Therefore, an access probe collision or mobile station registration will not occur as a result of Time Slot-6.

Because the access probes AP1, AP2 AP4, AP5, AP6, AP8 and AP9 are subject to access probes collisions in their respective time slots, these access probes would be resent to the base station as result of the corresponding mobile stations not receiving a registration response to the access probes (e.g. registration will be retried). If there are a large number of mobile devices attempting to register in the particular sector (e.g., in response to a reg_zone directive, periodically registering in accordance with the reg_period directive, or registering as part of the process of placing or receiving a call), the number of time slots that experience access probe collisions may increase and, consequently the number of retries being attempted and associated access probe collisions will continue to grow.

Example Illustration of Neighboring Sectors

Figure 4:
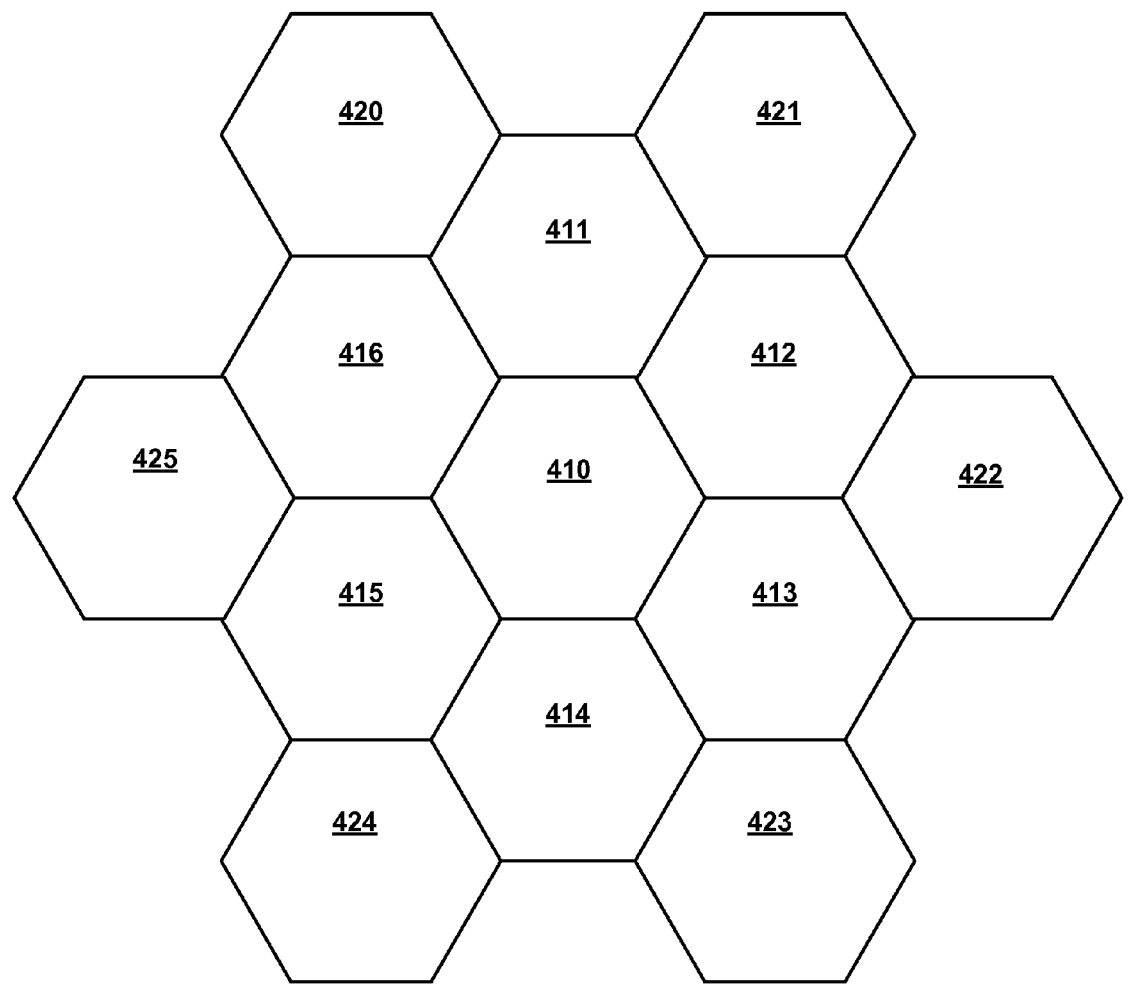
FIG. 4 is a diagram illustrating an arrangement of neighboring coverage areas within a wireless communication system.

FIG. 4 illustrates an example arrangement of neighboring wireless coverage areas that may be present in a wireless communication system. As used herein, the term "wireless coverage area" may refer to either cells or sectors within a wireless communication system. In this example, coverage areas 410-416 and 420-425 each contain a base station similar to base station 120 depicted in FIG. 1 that can communicate wirelessly with mobile stations located within the geographic area defined by wireless coverage areas 410-416 and 420-425.

Those skilled in the art will recognize that wireless coverage areas 410-416 and 420-425 are shown in a idealized manner. In practice, the geographic extent of wireless coverage areas 410-416 and 420-425 may be very different than shown in FIG. 4. For example, while distinct borders are shown between wireless coverage areas, the wireless coverage areas will be overlapping, such that there may be many locations where a mobile station can communicate with base stations in more than one wireless coverage area. As such, wireless coverage areas 410-416 and 420-425 are more representative of areas of optimal wireless communication.

As a mobile station moves from one wireless coverage area to another, a handoff process may be performed to allow a mobile station to continue wireless communication while moving between wireless coverage areas. Typically, a switch such as switch 125 depicted in FIG. 1 is responsible for switching calls to the base stations located within wireless coverage areas 410-416 and 420-425, and also controls handoffs between base stations within wireless coverage areas.

To facilitate handoffs between base stations within wireless coverage areas, a neighbor list is associated with each wireless coverage area 410-416 and 420-425. The neighbor list identifies other wireless coverage areas that are good candidates for receiving handoffs from a given wireless coverage area. For example, the neighbor list for wireless coverage area 410 may include wireless coverage areas 411-416 and 420-425. The neighbor list may also be arranged to reflect a priority order based on proximity of the wireless coverage areas, signal strength, or other parameters. For example, the neighbor list associated with wireless coverage area 410 may designate wireless coverage areas 411-416 as first-tier neighbors based on their proximity to wireless coverage area 410, and prioritize wireless coverage areas 411-416 as good candidates for handoffs.

The neighbor lists associate with each wireless coverage area 410-416 and 420-425 are typically stored in a database accessible by the switch responsible for controlling handoffs. Also, in a CDMA system, neighbor lists are also transmitted to mobile stations, which may allow mobile stations to monitor control information sent from a number of different wireless coverage areas. Various techniques for adjusting the registration frequency will now be described with reference to FIGS. 5-9.

Methods for Dynamically Adjusting a Mobile Station Registration Period

FIGS. 5-8 are flowcharts that illustrate various methods for dynamically adjusting a periodic registration period for mobile stations operating in a particular sector of a wireless communications system. The methods illustrated in FIGS. 5-8 are discussed with reference to FIGS. 1-4. Again, while these methods are described generally in the context of a CDMA2000 wireless communications system, other implementations are possible, such as in a GSM wireless communication system, or in an EV-DO system for example.

FIG. 5 is a flow chart that illustrates a high level method 500 for dynamically adjusting the radio-frequency registration period for mobile stations operating in a wireless communications system, such as the registration period associated with the reg_period directive in a CDMA 2000 wireless communications system. The method 500 includes, at block 510, determining that the transmission-success rate is less than a threshold level. As used herein, "transmission-success rate" refers to a success rate of messages sent via a forward link of an air interface in a cellular wireless communication system. In one implementation of the method, the messages sent via the forward link of the air interface are page messages sent from the wireless communication system to one or more mobile stations. When a page message is received by the mobile station, the mobile station sends an indication acknowledging receipt of the page message back to the wireless communication system via the reverse link of the air interface.

The wireless communication system can calculate the transmission-success rate by comparing the number of messages sent to mobile stations via the forward link of the air interface to the number indications the wireless communication system receives back from the mobile stations. The wireless communication system can then compare the calculated transmission-success rate to a predetermined threshold and determine whether the transmission-success rate is less than the threshold success rate.

The calculation of the transmission-success rate can be done on a number of different scales within the wireless communication system. For example, the transmission-success rate can be performed on a sector-by-sector basis, for the entire wireless communication system, or for subsets of a plurality of sectors within the wireless communication system.

If the wireless communication system determines that the transmission success rate is less than the threshold success rate, the wireless communication system can responsively increase the frequency with which mobile stations are required to register with the system, as shown in FIG. 5 at block 520. As indicated in FIG. 5, block 530, the wireless communication system can then transmit this increased registration frequency to the mobile stations. In a CDMA system, this can be achieved by decreasing the registration period in the reg_period directive sent to mobile stations.

The process of changing the registration period parameter could be implemented using service logic that is stored and executed on the BSC 124, for example. Of course, such service logic could be stored and executed elsewhere in the system 100, such as in the switch/gateway 125, as one alternative. Once the registration period parameter is decreased, the new value of the parameter is communicated to the mobile stations 105, 110 and 115 in the reg_period directive, which is communicated in the control channel of the forward-link of the air interface 107.

After receiving the revised registration period parameter, the mobile stations 105, 110 and 115 adjust the period at which they periodically re-register with in the system 100 in accordance with the modified registration period. This results in an increase in the number of periodic registrations in a given time period and corresponding decrease in the likelihood of a missed page message.

The increase in registration frequency may also be implemented on a variety of scales within the wireless communication system. For example, if a first sector is identified as having a transmission-success rate below the threshold success rate, the registration frequency can be increased in the first sector, as well as in the other sectors near the first sector. Such sectors can be identified and selected by the wireless communication system by using the neighbor list of the sector with the low transmission-success rate. In some implementations of the method, the registration frequency is increased in the sectors that are first-tier neighbors of the sector with the low transmission-success rate. In other implementations of the method other portions of the neighbor list, or even the entire neighbor list, may be used to identify sectors that should increase their required registration frequency. By increasing the registration frequency in sectors with low transmission-success rates and their neighboring sectors, mobile stations that are moving between adjacent sectors are required to register with the system more frequently, thus increasing the likelihood that the mobile station will be paged in the correct location.

As shown in FIG. 6, at block 620, the increase in registration frequency may be conditioned on a determination that the air interface has less than a threshold level of load. Since increasing the frequency at which mobile stations register with system increases the number of mobile stations attempting to communicate with the system via the air interface at any one time, it is possible that an increase in the registration frequency could overload a portion of the wireless communication system and cause undesired disruptions in service.

The determination that there is less than a threshold level of load on the air interface can be made in a number of ways. For example, such a determination may be made by determining that a certain percentage of bandwidth of the air interface (or of a certain channel of the air interface) is occupied communicating wireless signals between the mobile stations 105, 110 and 115 and the base station 120.

Once it is determined that the air interface 107 has at least the threshold level of load, the frequency of registration is increased and transmitted to the mobile stations, as depicted in blocks 630 and 640, respectively.

FIG. 7 is a flowchart that illustrates a method 700 for adjusting the periodic registration period based on the transmission-success rate of messages sent via the forward link of the air interface and conditioning the registration period adjustment on the forward-link load of the air interface for mobile stations operating in system 100. The method 700 includes, at block 710, determining that the transmission-success rate of messages sent via the forward link of the air interface is less than a threshold success rate. The method also includes, at block 720, determining that the forward-link has at least a threshold level of load. As indicated in block 720, this determination can be made by determining the number of timeslots in the forward-link paging channel 208 of the air interface 107 that are occupied. For the method 700, the overall occupancy of the paging channel 208 may be determined (e.g., regardless of the type of information being communicated in each of the paging channel 208's timeslots) or, alternatively, the occupancy of the paging channel's 208 timeslots may be determined based on the number of timeslots that are carrying access probe acknowledgements (responses to registrations requests).

In operation, the base station 120 will know how many access probe acknowledgements (or other types of paging channel messages) it is sending on the forward-link paging channel 208 in a given period of time, as well as how many timeslots are available on the forward-link paging channel 208 in the given period of time. The base station 120 may monitor the number of access probe acknowledgments using service logic that is present and executed on the BSC 124, for example. Then, based on this information, the base station 120 can readily determine what percentage of the forward-link paging channel's 208 timeslots are occupied with access probe acknowledgments (or with other types of paging channel messages). Based on this percentage, the base station 120 can determine if the load is under the threshold before permitting an adjustment to the periodic registration period.

Alternatively, the base station 120 could perform the forward-link threshold analysis by comparing the number of access probe acknowledgements that are scheduled to be sent in a given period of time with the number of acknowledgements that it is actually able to send in that period of time to determine an occupancy percentage for the forward-link paging channel 208. The base station 120 may then compare this percentage to the designated threshold to determine if an adjustment to the periodic registration period is appropriate.

As with the methods 500 and 600, the process of changing the periodic registration parameter based on the loading of the forward-link of the air interface 107 may be accomplished using service logic that is implemented in, for example, the BSC 124 of FIG. 1. For the method 700, the base station 120 communicates the modified registration period parameter to the mobile stations 105, 110 and 115 in a control channel message (e.g., the reg_period directive) over the air interface 107 at block 730. After the modified parameter is received by the mobile stations, they will conduct their periodic registrations in accordance with the new registration period.

FIG. 8 is a flowchart that illustrates a method 800 for adjusting the periodic registration period based on the transmission-success rate of messages sent via the forward link of the air interface and conditioning the registration period adjustment on the reverse-link load of the air interface for mobile stations operating in a wireless communications system, such as system 100 of FIG. 1. The method 800 includes, at block 810, determining that the transmission-success rate of messages sent via the forward link of the air interface is less than a threshold success rate. The method 800 also includes, at block 820, determining that the reverse link has at least a threshold level of load. As indicated in block 820, this determination can be made by determining the number of timeslots in an access channel of the reverse-link of the air interface 107 that contain sufficient energy to represent an access probe.

Referring to the table in FIG. 3, for this situation, this determination would result in all of the timeslots except Time Slot-6 being determined to include sufficient energy to represent an access probe. Therefore, approximately 85% of the timeslots would be determined as being "occupied." However, Time Slot-1, Time Slot-3 and Time-Slot 5 would not have a verifiable access probe (e.g., verified using a CRC) due to the access probe collisions that would occur in those time slots. Nevertheless, the fact that an access probe collision occurs in each of these slots makes it desirable to designate those slots as occupied so that they are accounted for in determining the load on the reverse link access channel 209 of the air interface 107. This determination can be made, for example, using service logic that is implemented in the base station 120 that monitors the number of occupied timeslots on the access channel 209 over a particular time period and determines the percentage of occupancy based on the number of timeslots available during that particular time period.

If the threshold for reverse-link load in the method of FIG. 8 were set at 90%, the situation illustrated in FIG. 3 would permit a decrease in the periodic registration period, because the 85% occupancy for the situation illustrated in FIG. 3 is less than a threshold of 90%. Once it is determined that there is less than the threshold level of load (occupancy) on the reverse-link—access channel 209 of the air interface 107 (e.g., less than 90%), the periodic registration frequency for the mobile stations is increased at block 830. As such, the increase in the periodic registration frequency is made in response to the determination that the transmission-success rate of messages sent on the forward link is less than a threshold level and conditioned on a determination that the level of load on the air interface is below a threshold level.

The increase in frequency depends on the particular situation and may be dynamically adjustable based the number of adjustments that have been made in a certain period of time, or the increase may be predetermined. The process of changing the periodic registration period parameter may also be accomplished using service logic that is implemented in, for example, the BSC 124 of FIG. 1. At block 840, the base station 120 communicates the modified registration period parameter to the mobile stations 105, 110 and 115 in a control channel message (e.g., reg_period directive) over the air interface 107. Once the modified registration period parameter is received, the mobile stations 105, 110 and 115 will conduct their periodic registrations in accordance with the modified parameter.

After the registration period parameter is modified, the base station 120 may continue to monitor the transmission-success rate and the load on the air interface 107 (in this case, the reverse-link). If the transmission-success rate increases above the designated threshold, the base station 120 may increase the registration period to its original value. For example, the increase of the registration period to it original value may be done incrementally in response to several determinations that the transmission-success rate is above the threshold. If the load increases above the designated threshold (e.g., 90% in the above example) the base station 120 may restore the registration period parameter to its original value and communicate another reg_period directive to the mobile stations, which will then resume periodic registration at the original (e.g., default) registration period after receiving this directive.

The methods 700 and 800 of FIGS. 7 and 8 may be implemented individually or may be implemented together. For example, implementing methods 700 and 800 together may permit multiple conditions to be placed on an increase in the registration frequency made in response to a determination that the transmission-success rate of messages sent via the forward link of an air interface is below a threshold level. In an embodiment where the methods 700 and 800 are implemented together, the base station 120 would detect that the transmission-success rate of messages sent via the forward-link of the air interface was less than a threshold success rate.

Before increasing the registration frequency in response to the sub-threshold transmission-success rate, the base station 120 would also confirm that the forward-link load (e.g., paging channel 208 occupancy) was less than a first designated threshold and that the reverse-link load (e.g., access channel 209 occupancy) was less than a second designated threshold. Based on the determinations that the forward-link load and the reverse-link load are both under their designated thresholds, the base station 120 will permit that a responsive increase the periodic registration frequency, such as in the manner described above.

CONCLUSION

Various arrangements and embodiments in accordance with the present invention have been described herein. It will be appreciated, however, that those skilled in the art will understand that changes and modifications may be made to these arrangements and embodiments, as well as combinations of the various embodiments without departing from the true scope and spirit of the present invention, which is defined by the following claims.

What is claimed is:

1. A method for handling registration requests in a cellular wireless communication system, the method comprising:
the cellular wireless communication system making a first determination that a transmission-success rate of messages sent via a forward link of an air interface in the cellular wireless communication system is less than a threshold success rate;
the cellular wireless communication system making a second determination that the air interface has less than a threshold level of load, at least in part by determining (i) that access channel time slot occupancy percentage on a reverse link of the air interface is lower than a threshold access channel time slot occupancy percentage and (ii) that paging channel time slot occupancy percentage on the forward link of the air interface is lower than a threshold paging channel time slot occupancy percentage; and
responsive to the first determination and second determination, the cellular wireless communication system increasing a frequency at which mobile stations register with the cellular wireless communication system via the air interface,
wherein increasing the frequency at which mobile stations register with the cellular wireless communication system via the air interface comprises decreasing a registration period in a registration-period directive to the mobile stations.

2. The method of claim 1 wherein the messages sent via the air interface are page messages.

3. The method of claim 1, wherein determining that the access channel time slot occupancy percentage is lower than a threshold access channel time slot occupancy percentage comprises detecting that there is less than a threshold percentage of access channel timeslots containing energy sufficient to represent an access probe.

4. The method of claim 1, further comprising operating a base station in the cellular wireless communication system to carry out the determining and increasing steps, wherein the mobile stations are within a coverage area of the base station.

5. The method of claim 1, whereby the mobile stations respond to the registration-period directive by attempting to register with the cellular wireless communications system via the air interface at the increased frequency.

6. The method of claim 5 further comprising:
identifying a first sector of the cellular wireless communication system wherein there is less than the threshold success rate; and
sending the registration-period directive, including the decreased registration period, in a set of sectors of the cellular wireless communication system.

7. The method of claim 6, wherein the set of sectors is defined by a neighbor list.

8. The method of claim 7, wherein the neighbor list is arranged in a predetermined priority order, and the set of sectors comprises a set of first-tier neighbors of the first sector.

9. The method of claim 8 wherein the set of sectors comprises all of the first-tier neighbors of the first sector.

10. A base station for use in a cellular wireless communications system, the base station including stored service logic that, when executed, provides for:
making a first determination that a success rate of messages sent via an air interface in the cellular wireless communication system is less than a threshold success rate;
making a second determination that an air interface in a cellular wireless communication system has less than a threshold level of load, at least in part by determining (i) that access channel time slot occupancy percentage on a reverse link of the air interface is lower than a threshold access channel time slot occupancy percentage and (ii) that paging channel time slot occupancy percentage on the forward link of the air interface is lower than a threshold paging channel time slot occupancy percentage; and
responsive to the first determination that the success rate of messages sent via the air interface is less than a threshold success rate and the second determination that the air interface has less than a threshold level of load, increasing a frequency at which mobile stations register with the cellular wireless communication system via the air interface,
wherein increasing the frequency at which mobile stations register with the cellular wireless communication system via the air interface comprises decreasing a registration period in a registration-period directive to the mobile stations.

11. A method for handling registration requests in a cellular wireless communication system, the method comprising:
the cellular wireless communication system making a first determination that a transmission-success rate of messages sent via a forward link of an air interface in the cellular wireless communication system is less than a threshold success rate;
the cellular wireless communication system making a second determination that the air interface has less than a threshold level of load, at least in part by (i) comparing a number of access probe acknowledgements that are scheduled to be sent in a period of time with forward link paging channel capacity in the period of time to determine a paging channel occupancy percentage, and determining that the paging channel occupancy percentage is lower than a threshold paging channel occupancy percentage, and (ii) determining, based on energy level in reverse link access channel timeslots, that access channel time slot occupancy is lower than a threshold access channel timeslot occupancy percentage; and
responsive to the first determination and second determination, the cellular wireless communication system increasing a frequency at which mobile stations register with the cellular wireless communication system via the air interface,
wherein increasing the frequency at which mobile stations register with the cellular wireless communication system via the air interface comprises decreasing a registration period in a registration-period directive to the mobile stations.

* * * * *